(12) United States Patent
Hurley

(10) Patent No.: US 7,739,914 B1
(45) Date of Patent: Jun. 22, 2010

(54) SYSTEM AND METHOD FOR PRELOADING A VALVE TESTER CONTROL ASSEMBLY

(76) Inventor: Lyndon J. Hurley, P.O. Box 70, Harrisburg, SD (US) 57032

( * ) Notice: Subject to any disclaimer, the term of this patent is extended or adjusted under 35 U.S.C. 154(b) by 0 days.

(21) Appl. No.: 12/422,652

(22) Filed: Apr. 13, 2009

(51) Int. Cl.
*G01L 7/00* (2006.01)

(52) U.S. Cl. ....................................... 73/700

(58) Field of Classification Search .............. 73/40.5 R, 73/700, 276; 137/613, 552; 219/75
See application file for complete search history.

(56) References Cited

U.S. PATENT DOCUMENTS

| | | | | |
|---|---|---|---|---|
| 4,114,426 A | * | 9/1978 | McLean | ................... 73/40.5 R |
| 4,174,733 A | * | 11/1979 | Eidsmore et al. | ............ 137/552 |
| 4,278,864 A | * | 7/1981 | De Facci et al. | ............... 219/75 |
| 5,398,721 A | * | 3/1995 | Pryor | .......................... 137/613 |

* cited by examiner

*Primary Examiner*—Jewel Thompson
(74) *Attorney, Agent, or Firm*—Jeffrey A. Proehl; Woods, Fuller, Shultz & Smith, P.C.

(57) ABSTRACT

A system and method of preloading a valve tester control assembly circuit includes a valve testing control apparatus comprising a fluid supply, a motor, and a fluid control assembly controlling working fluid flow from the fluid supply to the motor. The fluid control assembly comprises an operation valve fluidly connected to the fluid supply, an adjustable pressure-responsive valve fluidly connected to the operation valve, and a preload valve fluidly connected between the pressure-responsive valve and the motor. The method includes closing the preload valve so that fluid does not pass through the motor, opening the operation valve so that the fluid supply is in fluid communication with the pressure-responsive valve, operating the fluid supply to supply fluid to the pressure-responsive valve, and adjusting the pressure-responsive valve so that a pressure-sensing gauge in fluid communication with the pressure-responsive valve senses a desired maximum pressure for the fluid during testing of a valve.

12 Claims, 3 Drawing Sheets

SYSTEM AND METHOD FOR PRELOADING A VALVE TESTER CONTROL ASSEMBLY

BACKGROUND

1. Field

The present disclosure relates to valve exercisers and testers and more particularly pertains to a new system and method for preloading a valve tester control assembly to facilitate accurate setting of fluid pressure-sensitive elements of the system prior to usage for testing a valve.

2. Description of the Prior Art

Flow controlling valves, such as a fire hydrant valve or underground water supply valve, require periodic operation between open and closed positions for purposes of starting or stopping fluid flow through the valve, as well as testing the operation of the valve to make sure that it does indeed operate. Valve testing apparatus employ various means for controlling the torque applied to, and rotation speed of, the fluid control valve when operating the valve so that the valve is not damaged while operating the valve between open and closed conditions. Accurate control of the speed and rotation of the controlling valve during valve operation is thus important.

SUMMARY

In view of the foregoing disadvantages inherent in the known types of valve testing or exercising apparatus now present in the prior art, the present disclosure describes a new system and method for preloading a valve tester control assembly which may be utilized to facilitate accurate setting of fluid pressure-sensitive elements of the system prior to usage for testing a valve.

The present disclosure relates to a fluid control assembly for controlling flow of a working fluid through a valve testing apparatus employing a fluid supply and a motor operated by flow of the working fluid. The fluid control assembly comprises an operation valve for fluid connection to the fluid supply to selectively control movement of the working fluid from the fluid supply to the motor. The fluid control assembly further comprises an adjustable pressure-responsive valve having an inlet connected to the operation valve to permit fluid communication with the operation valve to receive flow of the working fluid from the operation valve. The pressure-responsive valve has an outlet, and has a normal condition in which working fluid entering the inlet of the pressure-responsive valve substantially completely flows to the outlet of the pressure-responsive valve, and also has a diverting condition in which at least a portion of the flow of the working fluid into the inlet of the pressure-responsive valve is diverted to a bypass outlet of the pressure-responsive valve. The pressure-responsive valve changes from the normal condition to the diverting condition when the pressure-responsive valve senses that a pressure of the flow of the working fluid entering the inlet of the pressure-responsive valve substantially equals or exceeds a threshold pressure. The pressure-responsive valve is manually adjustable to set the threshold pressure. The fluid control assembly may also comprise a preload valve that has an inlet connected to the outlet of the pressure-responsive valve to permit fluid communication between the outlet of the pressure-responsive valve and the inlet of the preload valve. The preload valve has an outlet for connection to the motor of the valve testing apparatus. The preload valve has an open condition in which flow of the working fluid through the preload valve is not blocked and a closed condition in which flow of the working fluid through the preload valve is substantially blocked such that the pressure-responsive valve is exposed to a maximum pressure generated by the fluid supply without allowing flow through the motor.

In another aspect, a valve testing apparatus with a preloading capability is disclosed which comprises a fluid supply configured to receive working fluid and provide a flow of the working fluid, and a motor configured to be rotated by flow of the working fluid through the motor. The motor has a rotatable shaft connectable to an operating stem of a fluid controlling valve. The apparatus further comprises a fluid control assembly configured to control flow of the working fluid between the fluid supply and the motor to control operation of the motor. The fluid control assembly comprises an operation valve having an input fluidly connected to the fluid supply to receive working fluid from the fluid supply, with the operation valve having an output. The control assembly further comprises an adjustable pressure-responsive valve having an inlet fluidly connected to the output of the operation valve to permit flow of the working fluid from the operation valve to the pressure-responsive valve. The pressure-responsive valve has an outlet. The pressure-responsive valve has a normal condition in which the flow of working fluid entering the inlet of the pressure-responsive valve substantially completely flows out of the outlet of the pressure-responsive valve, and a diverting condition in which at least a portion of the flow of working fluid entering the inlet of the pressure-responsive valve is diverted to a bypass outlet of the pressure-responsive valve. The pressure-responsive valve changes from the normal condition to the diverting condition when the pressure-responsive valve senses that a pressure of the flow of working fluid entering the inlet of the pressure-responsive valve substantially equals or exceeds a threshold pressure. The pressure-responsive valve is manually adjustable to set the threshold pressure. The control assembly further comprises a preload valve having an inlet connected to the outlet of the pressure-responsive valve to permit fluid communication between the outlet of the pressure-responsive valve and the inlet of the preload valve. The preload valve has an outlet fluidly connected to the motor. The preload valve has an open condition in which flow of working fluid through the preload valve is not blocked and the flow of working fluid is able to move through the motor, the preload valve having a closed condition in which the flow of working fluid through the preload valve is substantially blocked such that the pressure-responsive valve is exposed to a maximum pressure generated by the fluid supply without allowing flow of the working fluid through the motor.

In still another aspect, a method of preloading a valve tester control assembly is disclosed. The method includes providing a valve testing control apparatus comprising a fluid supply, a motor, and a fluid control assembly controlling flow of a working fluid between the fluid supply and the motor. The fluid control assembly comprises an operation valve fluidly connected to the fluid supply, an adjustable pressure-responsive valve fluidly connected to the operation valve, and a preload valve fluidly connected between the pressure-responsive valve and the motor. The method further includes closing the preload valve so that fluid from the fluid supply does not pass through the motor, opening the operation valve so that the fluid supply is in fluid communication with the pressure-responsive valve, operating the fluid supply to supply fluid to the pressure-responsive valve, and adjusting the pressure-responsive valve so that a pressure-sensing gauge in fluid communication with an inlet of the pressure-responsive valve senses a desired maximum pressure for the fluid during testing of a valve.

There has thus been outlined, rather broadly, some of the more important elements of the invention in order that the detailed description thereof that follows may be better understood, and in order that the present contribution to the art may be better appreciated. There are additional elements of the invention that will be described hereinafter and which will form the subject matter of the claims appended hereto.

In this respect, before explaining at least one embodiment or implementation in greater detail, it is to be understood that the scope of the invention is not limited in its application to the details of construction and to the arrangements of the components, and the particulars of the steps, set forth in the following description or illustrated in the drawings. The invention is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present invention.

The advantages of the various embodiments of the present invention, along with the various features of novelty that characterize the invention, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
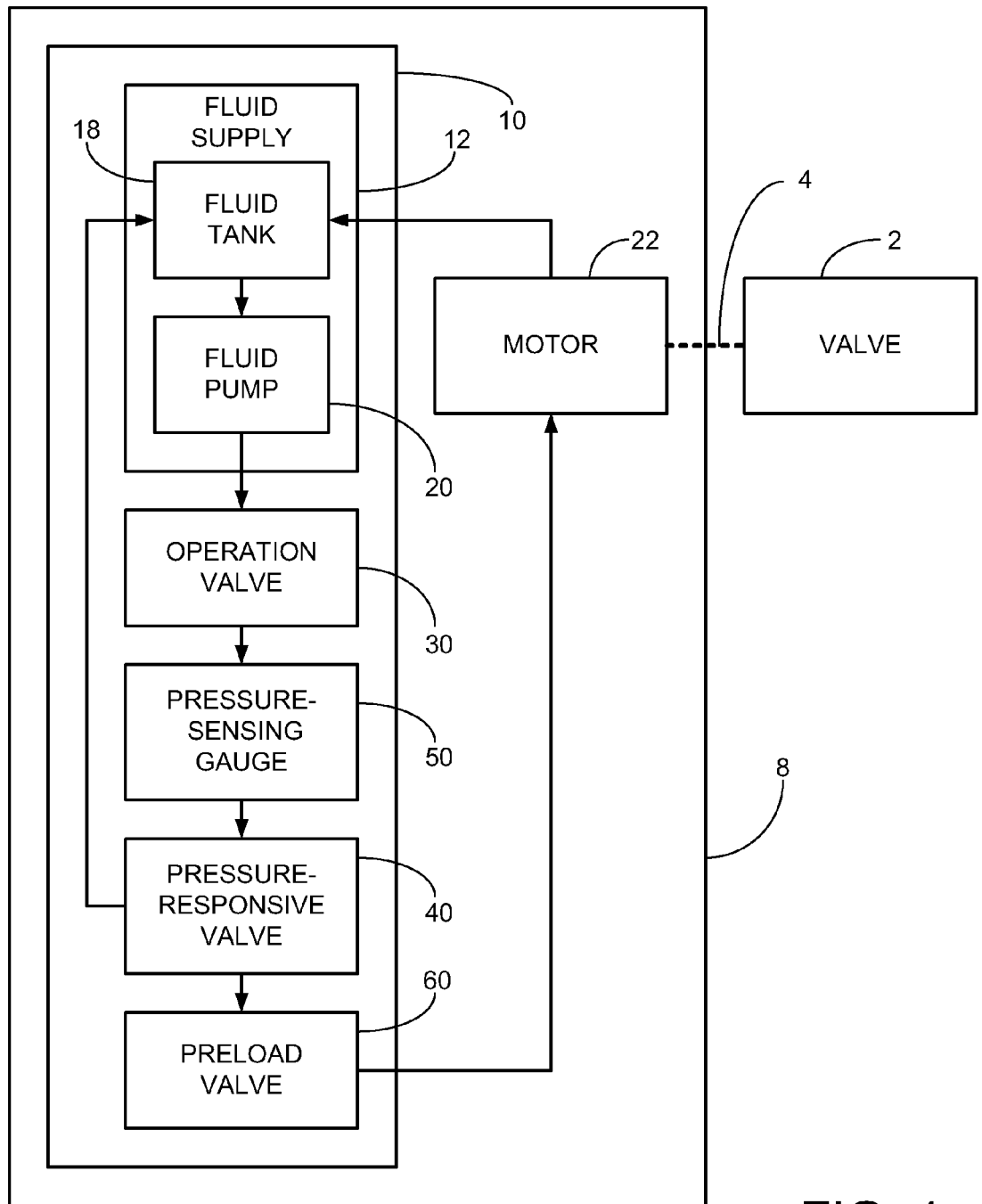
FIG. 1 is a schematic diagrammatic view of a new system for preloading a valve tester control assembly in the according to the present disclosure implemented on a valve testing apparatus.
Figure 2:
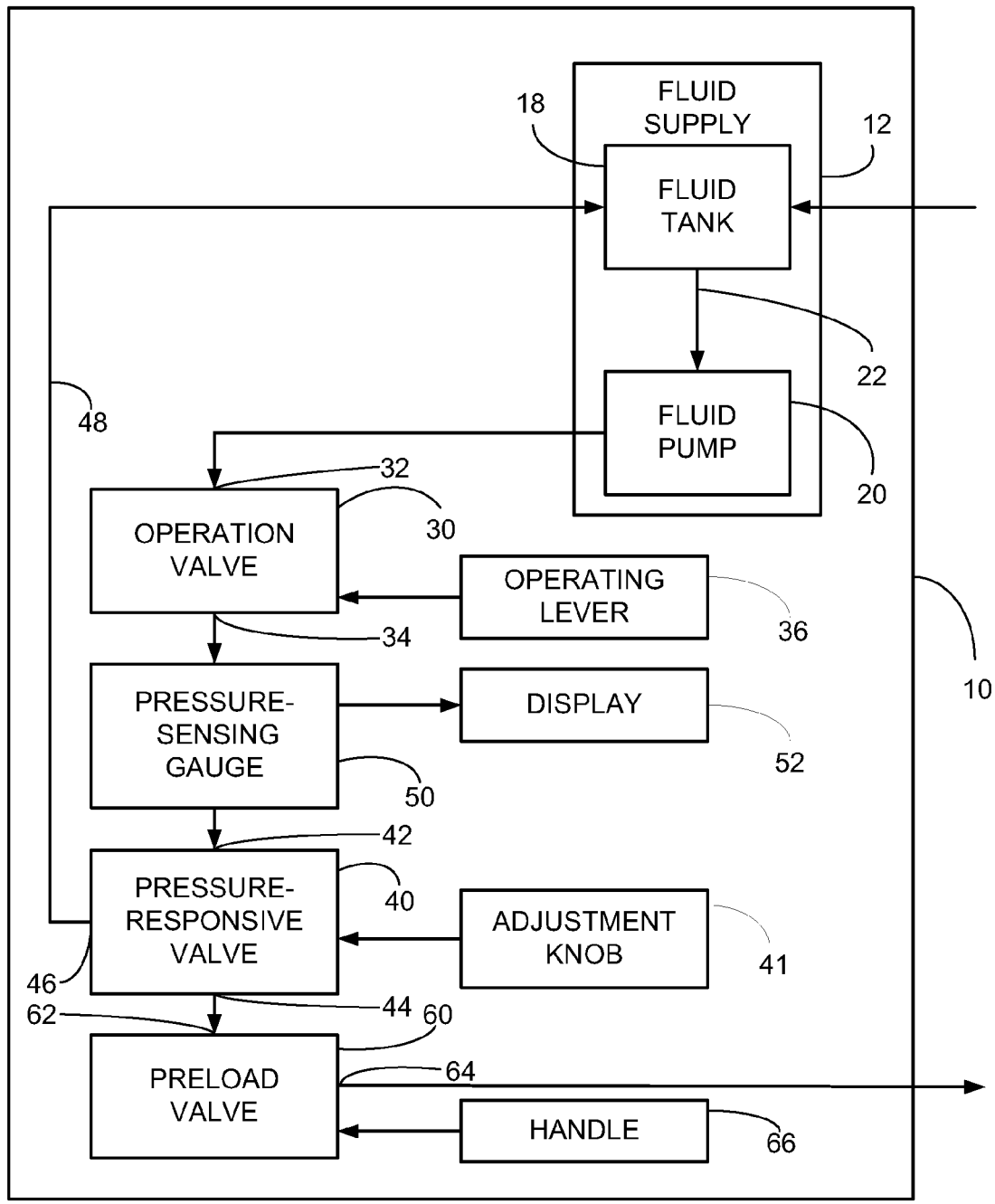
FIG. 2 is a schematic diagrammatic view of the control assembly, according to an illustrative embodiment.
Figure 3:
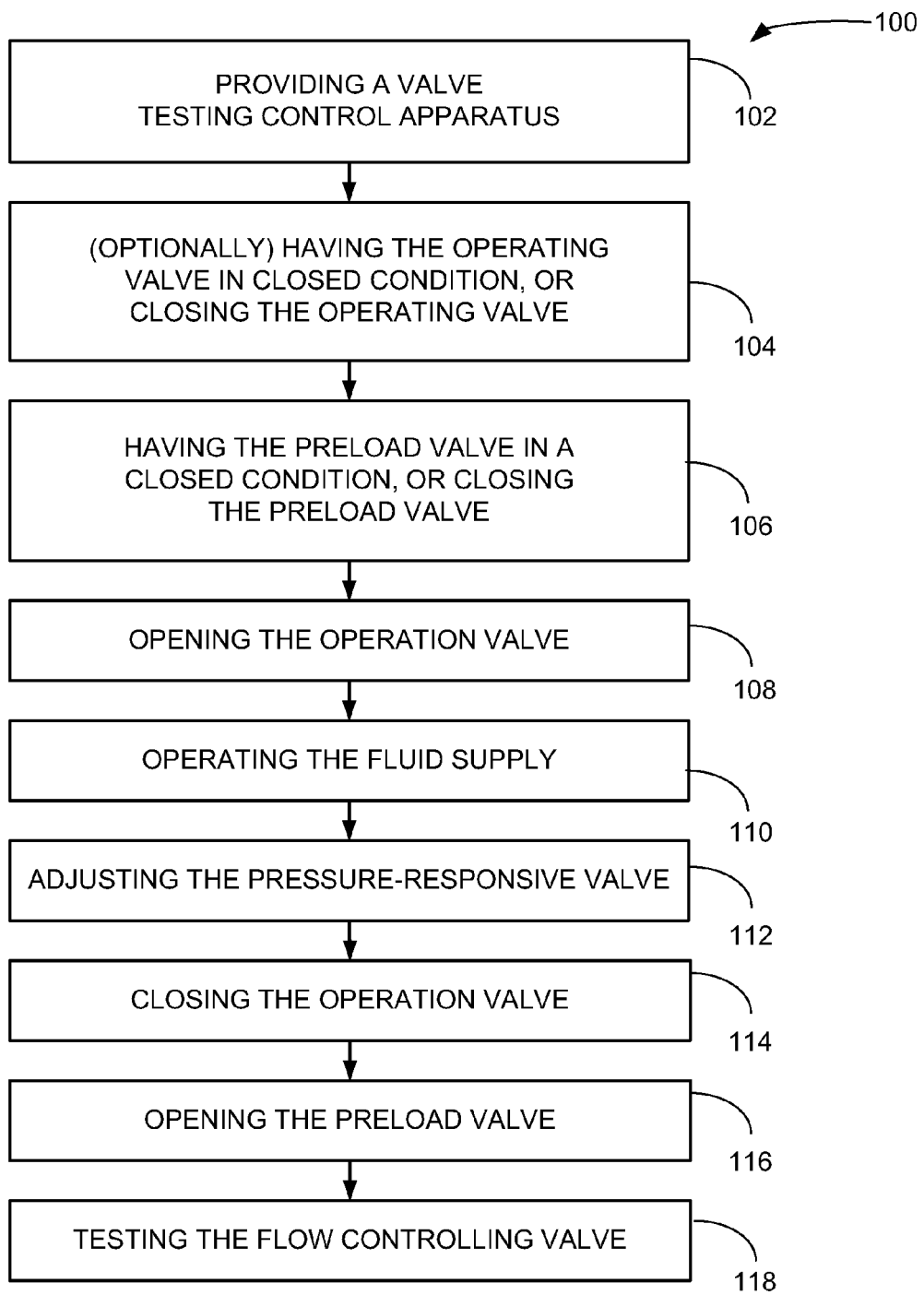
FIG. 3 is a schematic flow diagram of a method of the disclosure, according to an illustrative implementation.

With reference now to the drawings, and in particular to FIGS. 1 through 3 thereof, a new system and method for preloading a valve tester control assembly embodying the principles and concepts of the disclosed subject matter will be described.

In one aspect, the disclosure relates a control assembly 10 for a valve testing apparatus 8 that may be used to control operation of the valve testing apparatus, and advantageously provides the valve testing apparatus 8 with a capability to preload a pressure-responsive valve in the control assembly with pressurized fluid so that the pressure responsive valve may be adjusted and set for further operation of the valve testing apparatus in operating a fluid flow controlling valve 2.

In a broader sense, the valve testing apparatus 8 may comprise a fluid supply 12 that is configured to receive a working fluid and provide a flow of the working fluid (see FIG. 1). The working fluid is any suitable fluid for the purpose, but typically comprises a conventionally-available hydraulic liquid which may contain synthetic compounds, mineral oil, or even water and water-based mixtures. The fluid supply 12 may have a supply conduit 14 through which the working fluid is supplied or channeled to other components of the assembly, and which may be supplied at a relatively higher pressure for the purpose of transferring energy. The fluid supply 12 may also have a receiving conduit 16 that receives excess working fluid or fluid whose energy (in the form of pressure and flow) has been removed to some extent, and is usually received at a relatively lower pressure.

The fluid supply 12 may also include a fluid tank 18 that is configured to hold a quantity of the working fluid, although the inclusion of the fluid tank is not critical to the function of the control assembly. The fluid tank 18 may be configured and connected so as to be in fluid communication with the receiving conduit 16 so that fluid flowing in the receiving conduit is directed to the fluid tank. The fluid supply 12 may also include a fluid pump 20 that is configured to provide a flow of the working fluid from the fluid tank 12 to the supply conduit 14. The fluid pump 20 may be in fluid communication with the fluid tank 18. The fluid pump 20 may be powered by any suitable power source, such as by a hydrocarbon-fueled engine or electrically-driven motor, although other suitable means may be used. The fluid supply 12 may also include a linking conduit 22 that fluidly connects the fluid pump 20 to the fluid tank 18.

The valve testing apparatus 8 may also broadly include a motor 22 that is configured to rotate a shaft 24, which is typically but not necessarily the result of the working fluid flowing through the motor. The rotatable shaft 24 may be connectable to an operating stem of a flow controlling valve 2 (such as a water valve located on a fire hydrant on a main below ground level, for example) to rotate the operating stem and thereby operate the valve between open and closed conditions. The motor 22 may be temporarily and removably connected to the valve stem by a connecting shaft 4. The motor 22 may have a first motor fluid port 26 and a second motor fluid port 30. Fluid may be received and discharged through either of the first 26 and second 28 fluid motor ports to cause the motor to rotate the shaft 24 in either a first rotational direction or in a second rotational direction, depending upon whether the working fluid is moving into the first fluid motor port and out of the second fluid motor port, or is moving into the second fluid motor port and out of the first fluid motor port.

In general, the control assembly 10 controls the movement of the working fluid between the fluid supply 12 and the motor 22 in a manner that controls the operation of the motor and as a result the exercise of the valve 2 connected to the motor. The control assembly 10 may include an operation valve 30 configured to selectively control supply of the working fluid to the motor 22 to thereby control the rotation of the rotatable shaft 24 of the motor. The operation valve 30 may be in fluid communication with the supply conduit 14 of the fluid supply 12 to receive the working fluid from the fluid supply. The operation valve 30 has an input 32 and an output 34, with the valve controlling the fluid communication of the output 34 with the input 32. The input 32 is in communication with the fluid supply 12.

The operation valve 30 may have an open condition that permits the working fluid to substantially freely flow through the operation valve 30 between the input 32 and output 34 to the motor 22, and a closed condition that substantially blocks flow of the working fluid through the operation valve between the input 32 and the output 34 to the motor. Optionally, but preferably, the operation valve 30 has two open conditions which differ in which direction the fluid flows through the motor to control the rotational direction of the motor. In greater detail, a first open condition of the operation valve 30 causes the working fluid to flow into the first motor fluid port 26 and causes rotation of the motor in the first rotational direction. Conversely, a second open condition of the operation valve 30 causes the working fluid to flow into the second motor fluid port 28 and causes rotation of the motor in the second rotational direction. The selection of the first open condition and the second open condition of the operating valve 30 may be effected by the movement of an operating lever 36 on the valve 30 between two extremes on a linear path, and the closed condition of the valve 30 may correspond to a position of the lever 36 between the extremes of the linear path. Additionally, the operation valve 30 may be settable in the open condition, the closed condition, or positions between the open and closed conditions that present varying degrees of fluid communication between the input 32 and output 34 and thus control the level or rate of working fluid flow from the fluid supply 12 and ultimately the motor 22. This partially open operation may be effected by movement of the lever to a position between the position of the handle when the valve is in the closed condition and the position of the handle when the valve is in one of the open conditions.

The control assembly 10 may also include an adjustable pressure-responsive valve 40 that is responsive to the pressure of the working fluid passing through the valve 40 and directs the working fluid based upon the pressure detected in the fluid. The pressure-responsive valve 40 is in fluid communication with the operation valve 30 to receive flow of the working fluid from the operation valve. The pressure-responsive valve 40 may have an inlet 42 that receives the working fluid flow and an outlet 44 out of which the working fluid may flow after passing through the valve 40. The pressure-responsive valve 40 may be manually adjustable to set a threshold pressure at which the condition of the valve changes from one condition to another in response to the pressure, or the valve is somewhere in the middle of a transition between one condition and the other condition. The setting of the threshold pressure may be accomplished by the rotation of an adjustment knob 41 on the valve 40 that functions to adjust the pressure-sensing or pressure responsive elements of the valve 40. The pressure-responsive valve 40 may have a normal condition in which the pressure-responsive valve 40 does not divert any of the flow of working fluid moving through the pressure-responsive valve between the inlet 42 and outlet 44. The pressure-responsive valve 40 may also have a diverting condition in which at least a portion of the flow of the working fluid moving through the pressure-responsive valve (between the inlet 42 and outlet 44) is diverted to a bypass outlet 46. The portion of the flow of working fluid that is diverted to the bypass outlet 46 may be sent to the fluid supply 12 through a bypass line 48, such as to the fluid tank 18, so that the diverted portion of the working fluid does not reach the motor. The pressure-responsive valve 40 may change from the normal condition to the diverting condition when the pressure-responsive valve 40 senses that the pressure of the flow of the working fluid entering the inlet 42 of the pressure-responsive valve equals or exceeds the set threshold pressure, and in some embodiments may begin the transition when the pressure of the flow is approaching the set threshold level. It should be recognized that a portion of the working fluid moving into the inlet 42 of the pressure-responsive valve 40 may move through the outlet 44 while another portion of the working fluid moving into the inlet 42 may move through the bypass outlet 46, and this may lessen the pressure of the working fluid that is moved through the outlet 44 to the motor 22, particularly if the pressure-responsive valve 40 is sensing that the pressure of the working fluid at the inlet 42 is close to or exceeds the set threshold pressure.

The control assembly 10 may include a pressure-sensing gauge 50 in fluid communication with the outlet 44 of the pressure-responsive valve to sense a pressure of the working fluid exiting the valve 40. The pressure-sensing gauge 38 may have a display 52 that provides the user of the control assembly 10 with a visual indication of the pressure sensed by the gauge 50. The technology of the display may be analog or digital or electronic or mechanical. It should also be recognized that the display of the gauge 50 may not be a separate element, but may be integrated into another component, such as a data read out. It should be recognized that the gauge 50 need not be a gauge in the conventional sense, and may comprise any combination of elements that is able to sense or detect a pressure of the fluid and generate a perceptible output that indicates to the user the pressure level, or, in some embodiments, a torque level corresponding to the pressure that is being detected in the working fluid.

Significantly, the control assembly 10 may further include a means for selectively blocking flow of the working fluid between the pressure-responsive valve 40 and the motor 22 such that the pressure-responsive valve 40 may be exposed to a maximum pressure generated by the fluid supply 12 and a minimum (or no) flow, and this may be accomplished without exposing the motor 22 to the same pressure. In some embodiments, this functionality may be performed by a preload valve 60 that has an inlet 62 and an outlet 64. The inlet 62 of the preload valve 60 may be in communication with, and connected to, the outlet 44 of the pressure-responsive valve 40 of the assembly 10 by means of a conduit or other suitable fluid connection element. The outlet 64 of the preload valve 60 may be in fluid communication with, and connected to, one of the fluid ports 26, 28 of the motor 22, by means of a conduit or other suitable fluid connection element. The preload valve 60 may be a two position valve, with an open position or condition in which flow of the working fluid through the preload valve is not blocked or significantly impeded. The preload valve 60 may also have a closed position or condition in which the flow of the working fluid through the preload valve is substantially completely blocked from moving through the valve from the inlet 62 to the outlet 64. The preload valve 60 may be settable in either the open condition or the closed condition by means of a handle 66, and while it may be possible to set the preload valve in positions between the open and closed condition, this is not necessary to the function of the assembly 10 as the valve 60 will normally be fully open if not fully closed for preloading of the pressure-responsive valve.

The preload valve 60 may thus be configured to selectively block fluid flow between the pressure-responsive valve 40 and the motor 22 so that fluid does not flow through the motor, or at least does not move through the pressure-responsive valve 40. As a result of closing the preload valve 60, the pressure-responsive valve 40 is exposed to a maximum pressure generated by the fluid supply 12, and may also be exposed to no (or only minimal) flow of the working fluid. As further described below, the closing of the preload valve 60 allows the setting of the pressure-responsive valve 40 under conditions of the maximum pressure that is able to be generated by the fluid supply 12 for delivery to the motor 22 (if the preload valve 60 were to be opened). The preload valve 60 may be a manually operated or electrically-actuated valve. For example, the valve 60 may comprise a manually-actuated ball valve, or a solenoid-actuated gate valve.

It should be recognized that the various components of the control assembly 10 may be separate parts, or may be combined into one or more parts having more than one of the components incorporated therein. For example, the operation valve 30 and the adjustable pressure-responsive valve 40 (as well as other elements of the control assembly) may be formed by a single valve body element, and thus the valves may not be distinct elements or parts. Thus, the inputs and outputs and inlets and outlets of the various valves may be connected by passages formed in the body element. Further, a tap may be formed on the valve body for connection to the pressure sensing gauge 50. As a further option, the preload valve 60 may also be integrated into such a valve body.

Further, in some embodiments of the invention, the operation valve is connected to the pressure-responsive valve directly with no other valves or other flow-reducing means between these valves, and in some embodiments the pressure-responsive valve and the preload valve are directly connected together with no other valves or other flow-reducing means between these valves.

In another aspect, the disclosure relates a method 100 of preloading a valve tester control assembly or circuit (see FIG. 3). the method may include providing a valve testing control apparatus of the type that is described previously in this description, whether inclusive of all of the elements described or only some of the described elements (block 102). The method may optionally include moving or having the operation valve 30 in a closed condition at this point in the process (block 104), although this is not critical. The method may continue with blocking the flow of the working fluid to or through the motor 22 while the pressure responsive valve 40 remains exposed to the pressure of the working fluid. As described previously, this step may be illustratively accomplished by having the preload valve in a closed condition, or closing the preload valve 60 if it is in the open condition (block 106).

The method may further include, if closed, opening the operation valve 30 (block 108) so that fluid flow from the fluid supply 12 may reach the pressure-responsive valve 40, or is able to reach the valve 40 if there is not currently any fluid flow. The method may further include operating the fluid supply 12 to provide a flow of fluid to the pressure-responsive valve 40 (block 110). The fluid supply 12 may be set to an operating condition that corresponds to the operating condition of the fluid supply during the valve exercising operation to be performed. For example, if a throttle of an engine operating the pump 20 is to be operated at a full throttle level during the valve exercising operation, then the throttle may be set to the full throttle position for the preloading of the pressure-responsive valve. It should be recognized that the order of performance of these two steps is not critical, and the fluid supply may be operated prior to the opening of the operation valve.

The method may continue with adjusting the pressure-responsive valve (block 112), such as by the user manipulating the adjustment knob 41. The valve 40 may be adjusted to a point of adjustment at which the pressure-sensing gauge 50 senses (and the display 52 displays) the maximum pressure that is desired to be applied to the motor. The level of fluid pressure applied to the motor 22 may correspond to a level of toque applied by the motor to the valve 2 that is connected to the motor and being exercised by the valve testing apparatus 8. Once the threshold pressure level has been set, the method may continue with closing the operation valve (block 114) to terminate the preloading of the pressure-responsive valve 40. Opening the preload valve 60 may be performed, so that the pressure responsive valve 40 and the motor 20 are in fluid communication, although the closure of the operating valve 20 means that there will be little or no flow of the working fluid from the valve 40 to the motor 22. The pressure-responsive valve 40 is thus preset to the desired threshold pressure setting, and is ready for exercising one or more valves 2 at this setting. Testing of the flow controlling valve 2 may be conducted (block 118), and testing may include connecting the motor to the stem of the valve 2, operating the fluid supply 12 (if not already operating), and opening the operation valve 20 to provide a flow of working fluid to the pressure-responsive valve 40 and the motor 22 to cause the motor to rotate the valve 2. The pressure-responsive valve 40 will respond to levels of pressure in the working fluid that exceeds the set threshold pressure by diverting at least a portion of the working fluid entering the valve 40 to the bypass outlet 46 rather than the outlet 44 that is in communication with the motor 22.

The control assembly allows the pressure-sensitive valve, which controls torque applied to the flow controlling valve through control of the pressure, to be easily and accurately set at each exercising event for different valves, which often have different maximum acceptable torque and speed levels. The relationship between the pressure of the working fluid applied by the control assembly to the motor is readily converted to a corresponding torque applied by the motor to the flow control valve to which it is connected. The user is able to read directly from the display of the pressure-sensing gauge the pressure level (or optionally the torque level corresponding to the pressure level) and manually adjust the adjustment knob or control on the pressure-responsive valve to set the maximum level of pressure (and thus torque) permitted by the pressure-responsive valve before some of the working fluid is diverted from being sent to the motor. The presence of the preload valve in the control assembly allows the pressure-responsive valve to be exposed to the full pressure generated by the fluid supply prior to engaging or exposing the motor to the flow of the working fluid so that the pressure-responsive valve may be accurately and quickly set prior to each exercising event.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A fluid control assembly for controlling flow of a working fluid through a valve testing apparatus employing a fluid supply and a motor operated by flow of the working fluid, the fluid control assembly comprising:

an operation valve for fluid connection to the fluid supply to selectively control movement of the working fluid from the fluid supply to the motor;

an adjustable pressure-responsive valve having an inlet connected to the operation valve to permit fluid communication with the operation valve to receive flow of the working fluid from the operation valve, the pressure-responsive valve having an outlet, the pressure-responsive valve having a normal condition in which working fluid entering the inlet of the pressure-responsive valve substantially completely flows to the outlet of the pressure-responsive valve and a diverting condition in which at least a portion of the flow of the working fluid into the inlet of the pressure-responsive valve is diverted to a bypass outlet of the pressure-responsive valve, the pressure-responsive valve changing from the normal condition to the diverting condition when the pressure-responsive valve senses that a pressure of the flow of the working fluid entering the inlet of the pressure-responsive valve substantially equals or exceeds a threshold pressure, the pressure-responsive valve being manually adjustable to set the threshold pressure;

a preload valve having an inlet connected to the outlet of the pressure-responsive valve to permit fluid communication between the outlet of the pressure-responsive valve and the inlet of the preload valve, the preload valve having an outlet for connection to the motor of the valve testing apparatus, the preload valve having an open condition in which flow of the working fluid through the preload valve is not blocked and a closed condition in which flow of the working fluid through the preload valve is substantially blocked such that the pressure-responsive valve is exposed to a maximum pressure generated by the fluid supply without allowing flow through the motor.

2. The assembly of claim 1 additionally comprising a pressure-sensing gauge in fluid communication with the pressure-responsive valve to sense a pressure of the fluid acting on the pressure-responsive valve.

3. The assembly of claim 1 wherein the preload valve is a two position valve, the preload valve being settable in either the open condition or the closed condition.

4. The assembly of claim 1 wherein the at least a portion of the flow of working fluid being diverted to the fluid supply so that the working fluid does not reach the motor.

5. A valve testing apparatus with a preloading capability, comprising:
   a fluid supply configured to receive working fluid and provide a flow of the working fluid;
   a motor configured to be rotated by flow of the working fluid through the motor, the motor having a rotatable shaft connectable to an operating stem of a fluid controlling valve;
   a fluid control assembly configured to control flow of the working fluid between the fluid supply and the motor to control operation of the motor, the fluid control assembly comprising:
      an operation valve having an input fluidly connected to the fluid supply to receive working fluid from the fluid supply, the operation valve having an output;
      an adjustable pressure-responsive valve having an inlet fluidly connected to the output of the operation valve to permit flow of the working fluid from the operation valve to the pressure-responsive valve, the pressure-responsive valve having an outlet, the pressure-responsive valve having a normal condition in which the flow of working fluid entering the inlet of the pressure-responsive valve substantially completely flows out of the outlet of the pressure-responsive valve, the pressure-responsive valve having a diverting condition in which at least a portion of the flow of working fluid entering the inlet of the pressure-responsive valve is diverted to a bypass outlet of the pressure-responsive valve, the pressure-responsive valve changing from the normal condition to the diverting condition when the pressure-responsive valve senses that a pressure of the flow of working fluid entering the inlet of the pressure-responsive valve substantially equals or exceeds a threshold pressure, the pressure-responsive valve being manually adjustable to set the threshold pressure;
      a preload valve having an inlet connected to the outlet of the pressure-responsive valve to permit fluid communication between the outlet of the pressure-responsive valve and the inlet of the preload valve, the preload valve having an outlet fluidly connected to the motor, the preload valve having an open condition in which flow of working fluid through the preload valve is not blocked and the flow of working fluid is able to move through the motor, the preload valve having a closed condition in which the flow of working fluid through the preload valve is substantially blocked such that the pressure-responsive valve is exposed to a maximum pressure generated by the fluid supply without allowing flow of the working fluid through the motor.

6. The valve testing apparatus of claim 5 wherein the operation valve is connected to the pressure-responsive valve with no other valves between the operation valve and the pressure-responsive valve.

7. The valve testing apparatus of claim 6 wherein the pressure-responsive valve is connected to the preload valve with no other valves between the pressure-responsive valve and the preload valve.

8. The valve testing apparatus of claim 5 additionally comprising a pressure-sensing gauge in fluid communication with the pressure-responsive valve to sense a pressure of the fluid acting on the pressure-responsive valve.

9. The valve testing apparatus of claim 5 wherein the fluid supply comprises:
   a fluid tank configured to hold a quantity of working fluid, the fluid tank being in communication with the receiving conduit; and
   a fluid pump configured to provide a flow of the working fluid from the fluid tank to the supply conduit, the fluid pump being in fluid communication with the fluid tank.

10. A method of preloading a valve tester control assembly, comprising:
    providing a valve testing control apparatus comprising a fluid supply, a motor, and a fluid control assembly controlling flow of a working fluid between the fluid supply and the motor, the fluid control assembly comprising an operation valve fluidly connected to the fluid supply, an adjustable pressure-responsive valve fluidly connected to the operation valve, and a preload valve fluidly connected between the pressure-responsive valve and the motor;
    closing the preload valve so that fluid from the fluid supply does not pass through the motor;
    opening the operation valve so that the fluid supply is in fluid communication with the pressure-responsive valve;
    operating the fluid supply to supply fluid to the pressure-responsive valve; and
    adjusting the pressure-responsive valve so that a pressure-sensing gauge in fluid communication with an inlet of the pressure-responsive valve senses a desired maximum pressure for the fluid during testing of a valve.

11. The method of claim 10 additionally comprising closing the operation valve after the step of adjusting, and opening the preload valve.

12. The method of claim 11 additionally comprising:
    connecting the motor to a stem of a fluid control valve, operating the fluid supply; and
    opening the operation valve.

* * * * *